US006209835B1

(12) United States Patent
Walrath et al.

(10) Patent No.: US 6,209,835 B1
(45) Date of Patent: Apr. 3, 2001

(54) ADJUSTABLE MERCHANDISE DISPLAY STRUCTURE

(75) Inventors: John Walrath, Pewaukee, WI (US); Andre Martin, Laprairie (CA)

(73) Assignee: Imperial Tobacco Limited, Montreal (CA)

( * ) Notice: Subject to any disclaimer, the term of this patent is extended or adjusted under 35 U.S.C. 154(b) by 0 days.

(21) Appl. No.: 09/398,160

(22) Filed: Sep. 16, 1999

(51) Int. Cl.⁷ .................................................. E04G 3/00
(52) U.S. Cl. ................................... 248/276.1; 248/279.1
(58) Field of Search ............................... 248/279.1, 514, 248/729.15, 447.2, 231.71, 278.1, 447, 540, 536, 535, 229.1, 276.1, 286.1

(56) References Cited

U.S. PATENT DOCUMENTS

| | | | |
|---|---|---|---|
| 249,587 | * 11/1881 | Clark | 248/279.1 |
| 289,180 | 11/1883 | Tregurtha . | |
| 661,364 | * 11/1900 | Botz | 248/279.1 |
| 872,905 | * 12/1907 | Connors | 248/279.1 |
| 1,253,983 | * 1/1918 | Kuebler | 248/279.1 |
| 1,386,151 | * 8/1921 | Brewer | 248/279.1 |
| 1,494,212 | * 5/1924 | Bromley | 248/279.1 |
| 1,682,180 | * 8/1928 | Merrill | 248/447.2 |
| 1,745,695 | * 2/1930 | Hunter | 248/279.1 |
| 1,821,060 | * 9/1931 | Isaacson | 248/447.2 |
| 1,894,991 | 1/1933 | Hayes . | |
| 1,994,126 | * 3/1935 | Eddy | 248/279.1 |
| 2,530,265 | * 11/1950 | Phalen | 248/229.15 |
| 2,572,303 | * 10/1951 | Beebie | 248/229.15 |
| 2,954,909 | * 10/1960 | Miller | 248/514 |
| 3,243,497 | 3/1966 | Kendall et al. . | |
| 3,550,892 | 12/1970 | Propst | 248/282 |
| 3,638,973 | 2/1972 | Poletti | 285/184 |
| 3,643,902 | * 2/1972 | Gualano | 248/231.71 |
| 3,977,645 | 8/1976 | Deely | 248/484 |
| 4,249,712 | * 2/1981 | Delong | 248/279.1 |
| 4,402,481 | 9/1983 | Sasaki | 248/276 |
| 4,458,870 | 7/1984 | Duncan et al. | 248/279 |
| 4,562,987 | 1/1986 | Leeds et al. | 248/278 |
| 4,787,589 | * 11/1988 | Willingham | 248/279.1 |
| 5,284,313 | 2/1994 | Hallgren | 248/279 |
| 5,429,336 | 7/1995 | Ko | 248/278 |
| 5,641,191 | 6/1997 | Jia | 276/97.6 |

FOREIGN PATENT DOCUMENTS

| | | | |
|---|---|---|---|
| 40483 | 3/1976 | (CA) . | |
| 57789 | 1/1987 | (CA) . | |
| 67242 | 10/1990 | (CA) . | |
| 2005165 | * 8/1971 | (DE) | 248/229.15 |
| 728806 | * 4/1932 | (FR) | 248/514 |
| 163394 | * 5/1921 | (GB) | 248/447.2 |

* cited by examiner

Primary Examiner—Alvin Chin-Shue
(74) Attorney, Agent, or Firm—Wolf, Greenfield & Sacks, P.C.

(57) ABSTRACT

A merchandise display system has a carrier supported by an array of adjustably interconnecting arms from a mounting base. The mounting base is connectable to a mounting structure in a variety of different orientations so that the carrier can be displayed as desired. The mounting base has a clamp structure which is engageable with a horizontal counter edge, or with a vertical post or partition edge. Where no such edge is available the clamping structure can be detached allowing the mounting base to be mounted directly on a vertical wall surface, e.g. by wood screws.

8 Claims, 6 Drawing Sheets

ADJUSTABLE MERCHANDISE DISPLAY STRUCTURE

BACKGROUND OF THE INVENTION a) Field of the Invention

This invention relates to a new or improved adjustable merchandise display structure that is designed primarily for use in retail premises to provide a prominent adjustably positioned display to selected items of merchandise.

b) Description of the Prior Art

Numerous display structures have been developed over the years and designed to display various items of merchandise in retail stores. Some of these display structures have involved the use of adjustably interconnected arms, and such arm structures have been used in many other applications to provide an adjustable support arrangement for various articles. For example U.S. Pat. No. 153,943 Gray and U.S. Pat. No. 249,587 Clark demonstrate the use over one century ago of adjustable arm mechanisms for supporting dental trays.

U.S. Pat. No. 339,061 Joseph discloses a furniture clamp which can support a shaft extending either horizontally or vertically, and which includes a clamping screw which can be used for attachment to tables or the like. U.S. Pat. No. 454,553 Whitten shows a book supporting attachment having three sockets arranged at right angles to one another and including a screw clamp which can be affixed to a furniture projection.

SUMMARY OF THE INVENTION

It is an object of the present invention to provide an adjustable arm structure which is adaptable for attachment to various structures in a retail environment and which can be manipulated to display merchandise, e.g. tobacco products at a selected height above a countertop.

The invention provides a merchandise display system comprising a carrier supported by a plurality of adjustably interconnected arms, one said arm being received in a mounting base that is adapted for connection to a mounting structure, said mounting base comprising: a) a U-shaped clamping bracket comprising a flat web plate from a first side of which project two parallel limbs which define with the web a channel, an adjustable clamping means being associated with one said limb and operative to coact with the other said limb to clamp said bracket to the mounting structure; b) an attachment plate which lies parallel to an opposite side of said web plate and is detachably connected to said web plate by threaded screws that pass through aligned holes in said web plate and said attachment plate respectively, said holes being positioned for mutual alignment in a plurality of different orientations of said plate relative to said web; said attachment plate having connected thereto a sleeve that defines an axis lying parallel to said attachment plate, said sleeve being sized to slidably receive said one arm therein and including releasable locking means operative to secure said one arm at a selected longitudinal position therein; a first swivel joint inter-connecting an end of said one arm with an adjacent end of a second said arm, said swivel joint including a swivel clamp that is operative to lock together said first and second arms in a selected relative orientation thereof.

The U-shaped clamping bracket is preferably fabricated from a sheet steel plate bent to form a channel section, the flanges of the channel section constituting the parallel limbs. The sheet steel plate is of sufficient thickness to provide the desired degree of strength and rigidity to the mounting attachment. The web plate is substantially rectangular and has four regularly spaced threaded apertures therein. The attachment plate is similar in size to the web plate, and also has four apertures therein arranged at the same spacing as the threaded apertures. Threaded fasteners such as screws can be passed through the apertures in the attachment plate to engage with the aligned threaded apertures to secure the attachment plate to the web plate.

It will be appreciated that because of the uniform distribution of the apertures the attachment plate can be secured to the web plate in different orientations at 90° intervals. If desired, additional matching apertures could be provided in the web plate and in the attachment plate to enable their interconnection at angular intervals other than 90°.

The adjustable clamping means can be of any suitable structure, and conveniently comprises the arrangement of a clamping screw in threaded engagement with one limb of the clamping bracket and having at one end a toggle driver and at the other end a clamping head presented towards the other limb of the bracket so that rotation of the clamping screw can be utilized to clamp the bracket, e.g. onto the edge of a countertop in a retail premises. If no countertop is available, then the clamp can alternatively be attached to a vertically extending member, e.g. the edge of a partition wall or the like. In either situation the attachment plate can be oriented relative to the clamping bracket so that the arm of the display mechanism that is received in the attachment plate sleeve is arranged at the desired orientation.

In the event that no suitable structure is available for engagement by the clamping bracket, the mounting base can be disassembled by withdrawing the clamping bracket, and securing the attachment plate directly to a vertical wall surface, e.g. by screws passed through the holes in the attachment plate and engaged into the wall structure.

BRIEF DESCRIPTION OF THE DRAWINGS

The invention will further be described, by way of example only, with reference to the embodiment shown in the accompanying drawings wherein.

DESCRIPTION OF THE PREFERRED EMBODIMENTS

Figure 1:
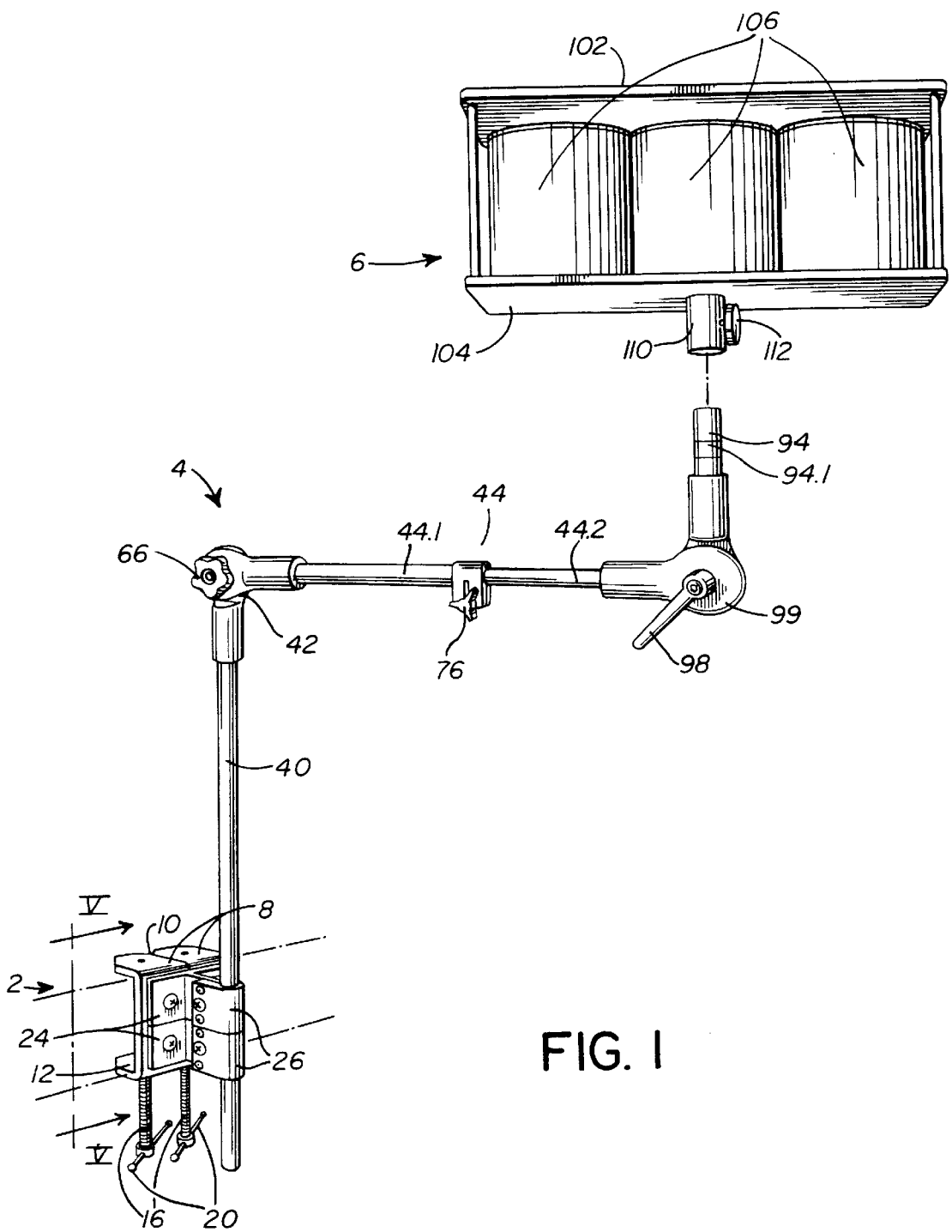
FIG. 1 is a perspective view of the overall merchandise display system in accordance with a preferred embodiment of the invention.

As seen in FIG. 1, the merchandise display system of the present invention comprises a mounting base 2 which provides support for an adjustable arm structure 4 which in turn carries a product case 6. As is more clearly seen in FIG. 5 the mounting base 2 comprises a mounting bracket 8 of metal plate formed into two U-shaped channels each comprising horizontal upper and lower flanges 10, 12 interconnected to opposite ends of a vertical web plate 14.

Each of a pair of clamping screws 16 extending parallel to the plate 14 is in engagement with a threaded hole in a lower flange 12, the screw having an enlarged head 18 at its upper end and a radial toggle bar 20 extending through its lower end. It will be understood that rotation of the clamping screw will cause the head to move towards or away from the upper flange 10 and enable the mounting brackets to be clamped onto a counter edge portion 22 by tightening each screw so that its head presses against the counter portion and clamps it against the underside of the upper flange 10. In the embodiment illustrated there are two clamping screws 16 which adds security and a degree of stability, although in some circumstances a single screw will suffice, and in other circumstances more than two screws may be desired.

Figure 8:
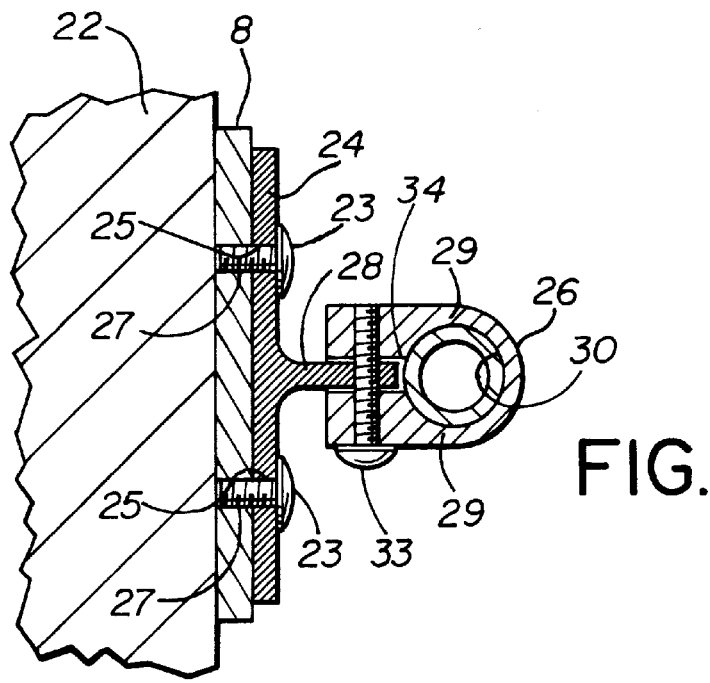
FIG. 8 is a sectional view taken on the line 8—8 in FIG. 5.
Figure 9:
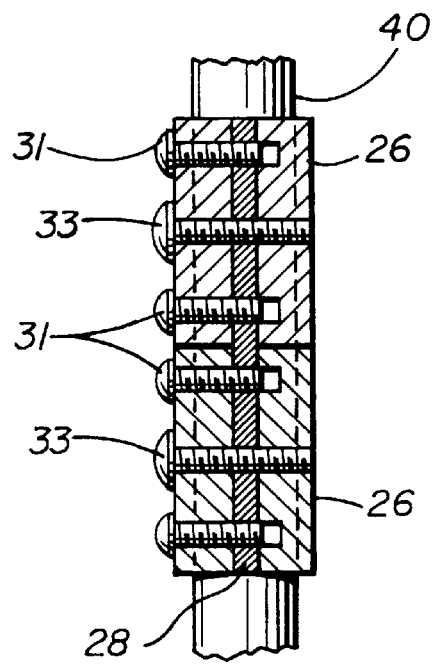
FIG. 9 is a sectional view taken on the line 9—9 in FIG. 5.

On the rear side of the web plates 14 are two rectangular steel attachment plates 24 each of which carries a sleeve 26. The sleeves 26 are mounted on a wall 28 that extends at right angles from each plate 24. The attachment plates 24 are substantially identical in form, and the wall 28 of each provides support for a respective sleeve 26, the sleeves being in axial alignment. As better seen in FIGS. 8 and 9 each sleeve 26 is of substantially C-shaped form defining a generally cylindrical through passage 30, a gap 34 extending between the limbs 29 of the sleeve receive the wall 28 with clearance and opens into the cylindrical passage 30. Each sleeve 26 is secured to the associated wall 28 by a pair of screws 31 in threaded engagement with the wall. Additionally, each sleeve 26 carries a clamping screw 23 which passes through clearance holes in one of the limbs 29 and the wall 28 and is in threaded engagement with the second limb 29. It will be evident that tightening of the screw 33 will be effective to narrow the gap between the limbs 29 and the wall 28 and thus constrict the cylindrical passage 30, binding the sleeve 26 to the cylindrical arm 40. On the other hand slackening of the screw 33 will allow the sleeve 26 to relax, releasing the engagement between the sleeve 26 and the arm 40 so that the latter can be moved longitudinally relative to the sleeve 26. As noted, the wall 28 is received with clearance in the narrow gap 34 between the two limbs 29 so that tightening of the screws 33 will have the effect of narrowing the gaps 34 and thus constricting the cylindrical passage 30, the sleeve 26 being of a resilient metal which can readily accommodate the deflection involved.

Figure 5:
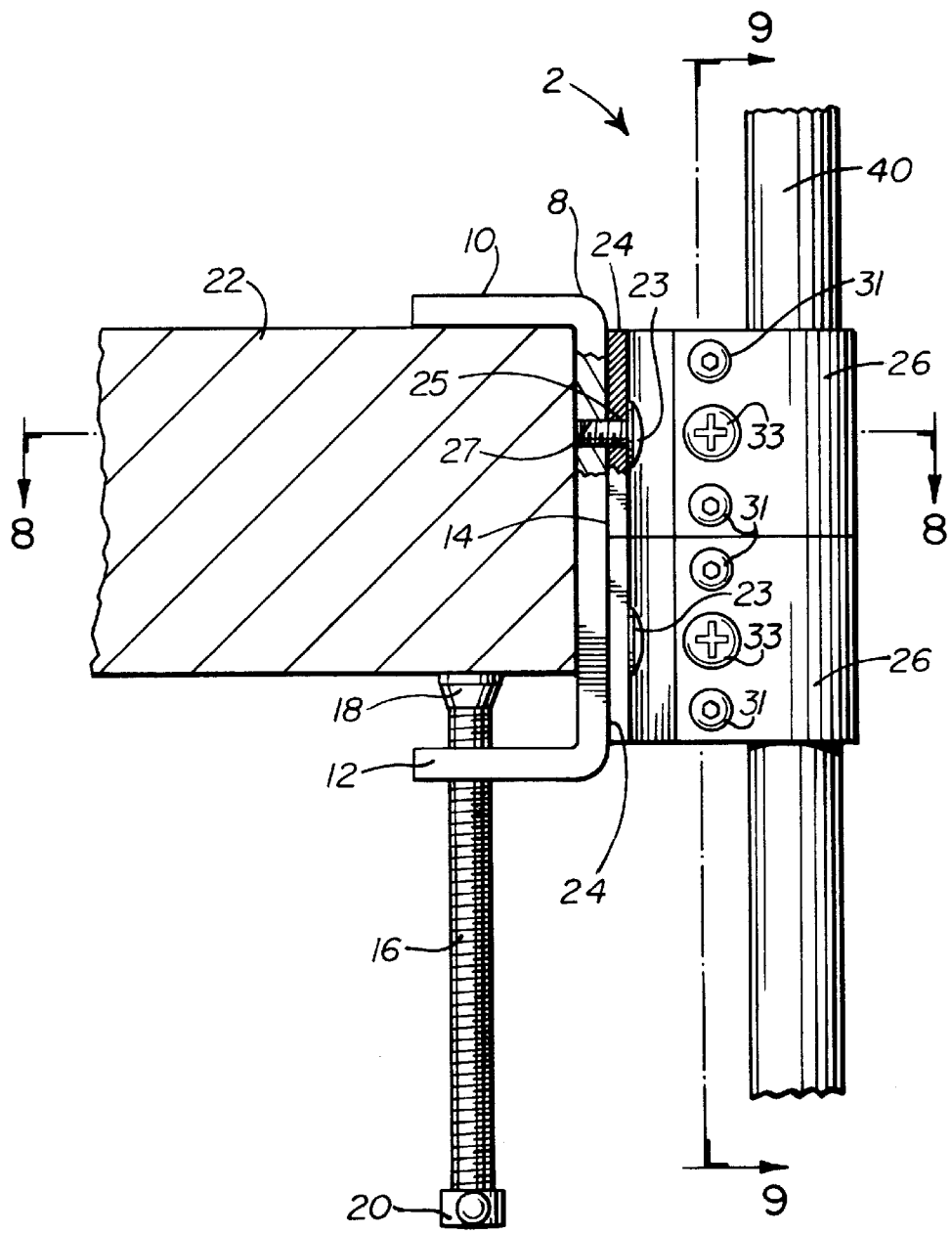
FIG. 5 is a sectional view taken on the line V—V in FIG. 1 and drawn to a larger scale.

The attachment plates 24 are rigidly secured with respect to the mounting bracket 8 by means of four short machine screws 23 which pass through corresponding holes 25 in the plates 24 and are received in threaded engagement in holes 27 in the web plates 14. The two sets of holes 25 and 27 are arranged in identical square patterns and can be readily aligned to secure the attachment plates 24 to the mounting bracket 8 as seen in FIG. 5. It will also be appreciated that because of the regular spacing of the two sets of holes, the plates 24 can likewise be secured to the mounting bracket 8 at orientations angularly spaced by 90° from that shown in FIG. 5.

A first tubular arm 40 of the adjustable arm structure has an outside diameter corresponding to the bore of the cylindrical passage 30 so that when the passage is in unconstricted form the arm 40 can be inserted into and adjusted longitudinally relative to the passage 30. Once a desired position of adjustment has been achieved the screws 33 are tightened to lock the arm 40 relative to the attachment plates 24.

Figure 2:
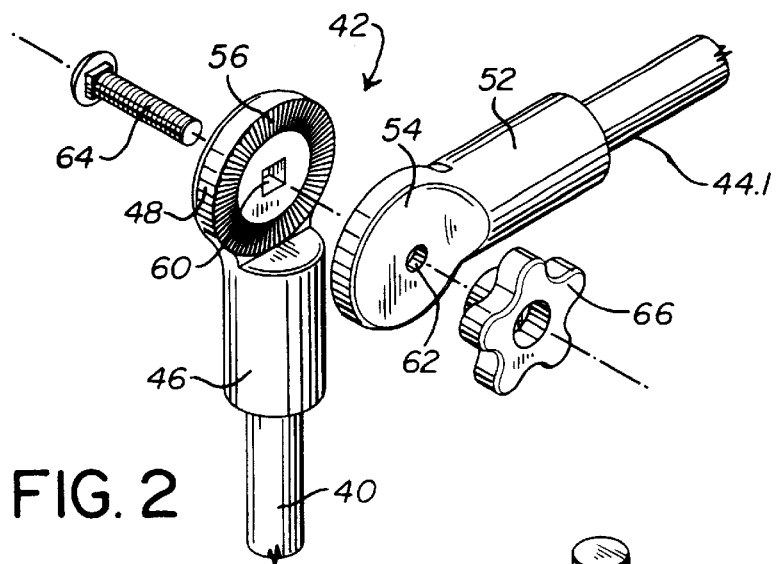
FIG. 2 is an exploded fragmentary perspective view to a larger scale showing the interconnection of first and second arms of the system.

An adjustable pivot joint 42 interconnects the upper end of the arm 40 to one end of a second arm 44, this joint being shown in greater detail in FIG. 2 to which reference is now made. A tubular fitting 46 defines a socket that receives and is rotatable relative to the upper end of the arm 40. The fitting 46 terminates in a flat circular plate 48 extending diametrically thereof. A second tubular fitting 52 is attached to one end of the second arm 44 and likewise has a diametrical circular plate 54 thereon. As clearly shown in FIG. 2, the circular plate 48 has an annular ring of radially extending ribs 56, these ribs being at successive angular intervals, e.g. of 10°. A similar array of ribs (not shown) is provided on the confronting surface of the plate 54. The plate 48 has a central square-section hole 60 therein which aligns with a round central holes 52 in the plate 54, these holes being sized to receive a carriage bolt 64 passed therethrough, the bolt being received in non-rotatable condition in the square hole 60, passing through the round hole 62 and being in threaded engagement with a knob 66. It will be seen that tightening of the knob 66 on the carriage bolt 64 will cause the plates 48 and 54 to be pressed against one another so that the interengaging ribs 56 become locked and the arm 44 is thus secured in a predetermined fixed angular orientation with respect to the arm 40. To reposition the arm 44 relative to the arm 40 it is merely necessary to slacken the knob 66 to provide sufficient clearance for disengagement of the confronting ribs, whereupon the arm 44 can be swivelled to a new location and locked therein by tightening of the knob 66.

By virtue of the rotatable connection between the fitting 46 and the arm 40, the arm 44 and all the elements supported thereon can be pivoted around the vertical axis of the arm 40.

Figure 3:
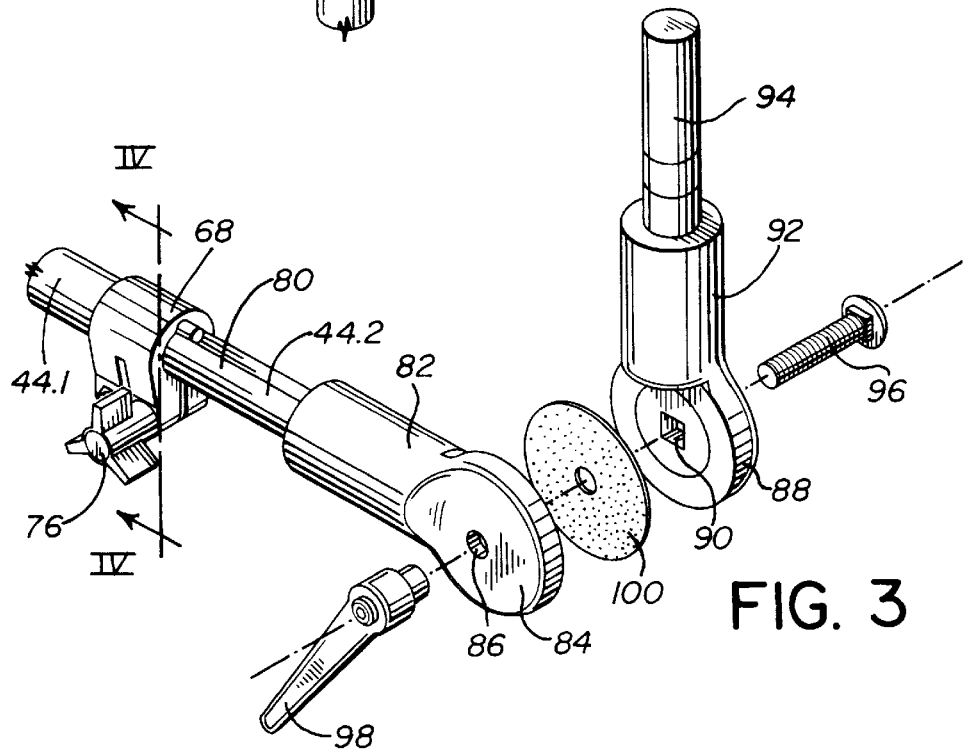
FIG. 3 is an exploded perspective view to the same scale as FIG. 2 showing the attachment of the second arm of the display system to a support pin.
Figure 4:
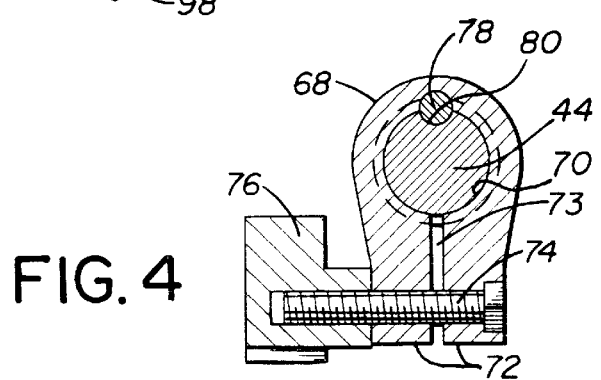
FIG. 4 is a sectional view taken on the line IV—IV in FIG. 3 drawn to an enlarged scale.

The arm 44 as seen in FIG. 3 and in FIG. 1 comprises telescopically arranged tubular sections 44.1, 44.2, the outer of which carries at its end a clamping bracket 48 formed with a tubular bore 70 to receive the smaller diameter section 44.2. A radial slot 73 extending from the bore 70 to the exterior of the clamping bracket separates the two limbs 72. A screw 74 carried in one of the limbs extends across the gap and through the other limb, being engaged by a threaded knob 76 which can be manually operated to tighten or to constrict the bore 70 about the inner arm section 44.2. A rod-shaped key 78 carried in the clamping bracket 68 is in sliding engagement with an axially extending groove 80 in the arm section 44.2. The key 78 permits the arm sections 44.1, 44.2 to be telescoped in the axial direction, but prevents relative rotation therebetween.

At the free end of the arm section 44.2 is attached a tubular fitting 82 which terminates in a flat circular plate 84 formed with a central bore 86 and arranged in confronting relationship with a similar plate 88 formed with a central square hole 90, the plate 88 being formed at the end of a fitting 92 which terminates in a cylindrical pin 94. A carriage bolt 96 is sized to pass through and engage the square hole 90, pass through the bore 86 and be threadedly engaged by a rotatable lever clamp 98. The confronting faces of the plates 84 do not have serrations or ribs, but are relatively smooth, and a friction disc 100 is interposed between them as indicated in FIG. 3.

From the foregoing it will be understood that when the plates 84, 88 are pressed against opposite sides of the friction disc 100 and the lever 98 threaded onto the carriage bolt 96, rotation of the lever in one sense will serve to clamp the elements together and thus fix the pin 94 at a desired angular disposition with respect to the arm 44. However when it is desired to reposition the pin it is merely necessary to slacken the lever clamp 98 slightly, and the pin can then be adjusted continuously throughout the full range of angular movement rather than being confined to 10° adjustment increments as is the joint 42.

As seen in FIG. 1, the product case 6 is a generally box-shaped element having rectangular upper and lower walls 102, 104. The front and the sides of the casing can be open, or can be of transparent material to reveal the product 106 displayed therein. On the underside of the lower wall 104 there is a downwardly extending tubular socket 110 sized to receive the pin 94, and carrying a clamping screw 112 which can be tightened to form a secure attachment to the pin 94. The pin 94 has a short section 94.1 that is of reduced external diameter, this section being aligned with the clamping screw 112 when the product case is supported on the pin. The effect of the reduced diameter section 94.1 is to ensure that any surface deformities created therein by engagement of the clamping screw 112 will not exceed the diameter of the remainder of the pin 94, and therefore will not interfere with the mounting attachment of the socket 110 on the pin 94.

The display structure described and illustrated can be attached to a counter surface as shown in FIGS. 1 and 5 by means of the mounting bracket 8, and the arms 40 and 44 and pin 94 adjusted in position with respect to the mounting base 2 to orient and locate the product display case 6 in a desired location. The adjustments available are briefly as follows:

1) axial and angular adjustment of the arm 40 with respect to the sleeve 26;
2) angular adjustment of the arm 44 above the upper end of arm 40;
3) extension or retraction in the length of the arm 44;
4) angular adjustment of the pin 94 with respect to the arm 44; and
5) rotation of the casing 6 about the axis of the pin 94 and socket 110.

Figure 6:
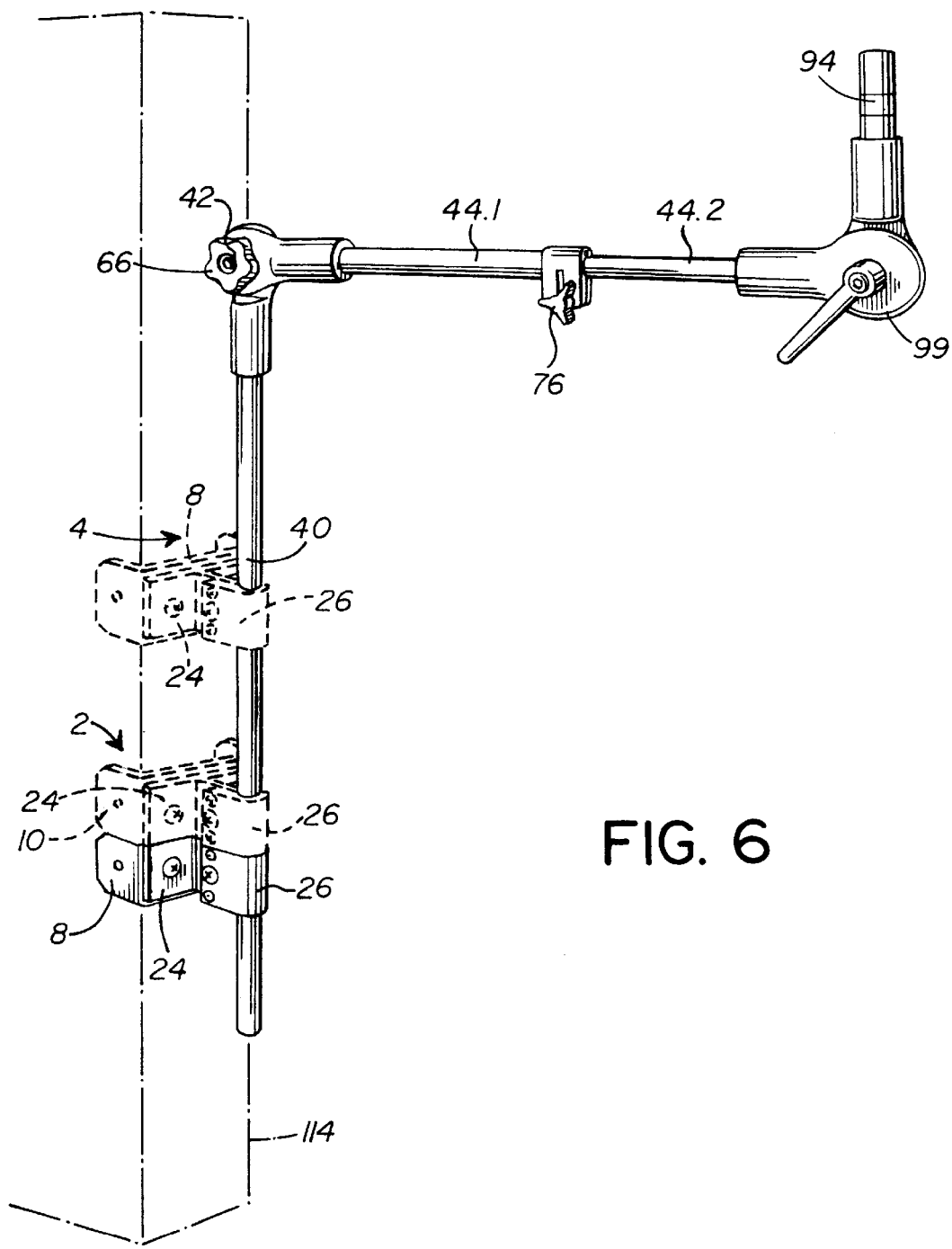
FIGS. 6 and 7 are perspective views generally similar to FIG. 1 and showing different mounting arrangements for the merchandise display system.
Figure 7:
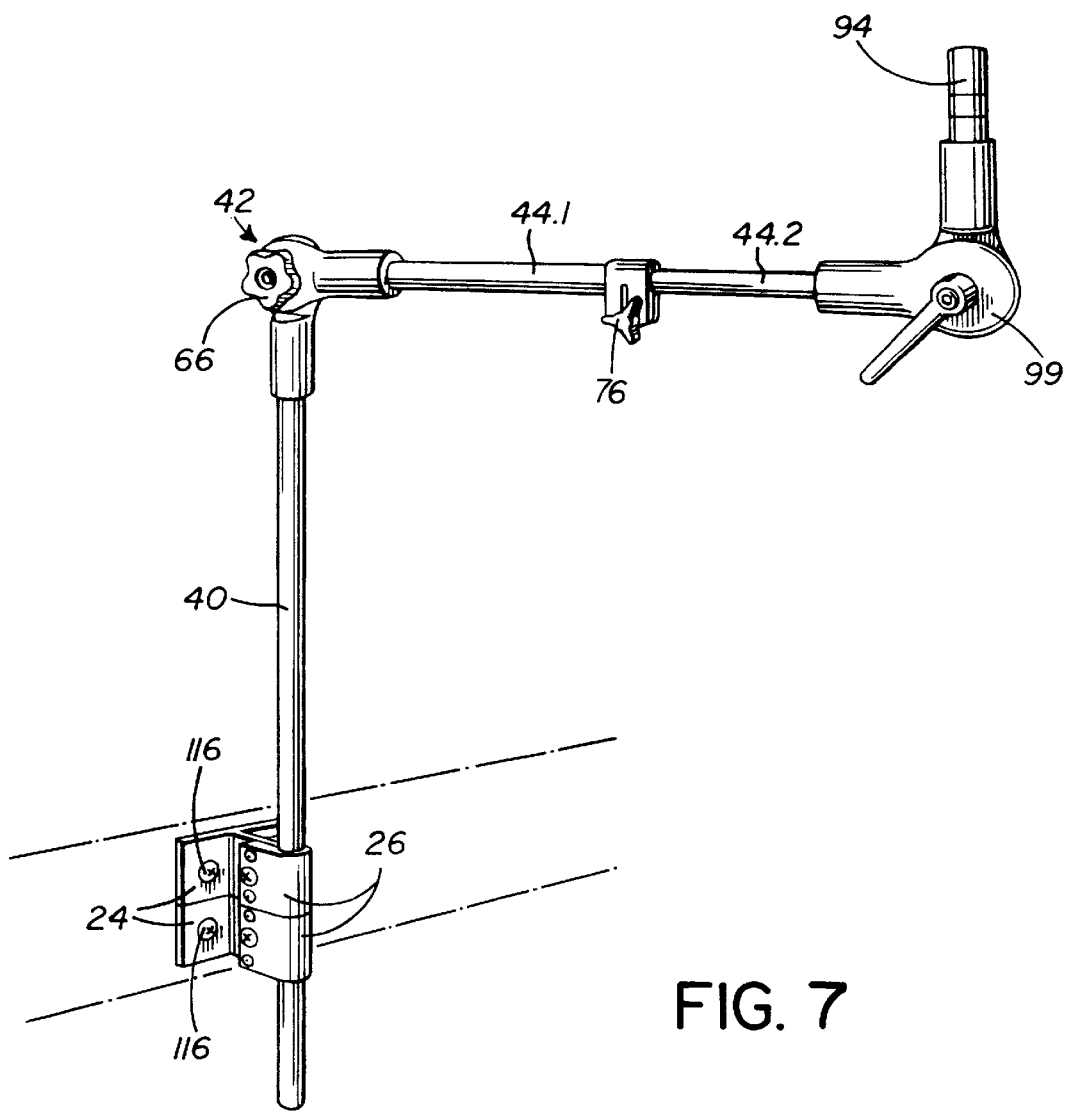

It will be understood that adjustment in the position of the product case 6 can be achieved rapidly and relatively simply by manipulation of the previously described adjustment control elements.

Where no horizontal counter edge is available to provide a mounting for the display system as shown in FIGS. 1 and 5, a vertical wall edge or partition edge 114 or even a post (not shown) can be utilized as indicated in FIG. 6. To accomplish this requires a minor manipulation of the mounting base. Specifically the four machine screws 23 interconnecting the attachment plate 24 to the web plate 14 are removed whereupon the mounting bracket 8 is rotated through 90° and reattached to the mounting plate by the same four screws. The mounting bracket can then be clamped to the vertical structure 114 as shown in FIG. 6. As is evident from FIGS. 5 and 6, the mounting bracket 8 is formed of two individual U-shaped sections, which in the configuration shown in FIG. 5 form with the attachment plates 24 a unitary structure. However in the configuration shown in FIG. 6 the mounting plate sections are rotated through 90 degrees from the position shown in FIG. 5 and the gap between them is now aligned with the junction between the plates 24. Accordingly, one of the mounting plate sections 8 can be displaced longitudinally of the arm 40 and attached to the partition edge 114 at a location vertically spaced from the other as shown in broken lines in FIG. 6, this providing a more secure attachment of the structure. The spacing between the two mounting brackets longitudinally of the arm 40 can be adjusted continuously to achieve the desired support characteristics.

Where no vertical or horizontal edge structure is available, the display system can nevertheless still be mounted to any suitable vertical surface that is available. To do this, the attachment plate 24 is removed from the mounting bracket 8, and then connected directly to a vertical surface as indicated in FIG. 7 by means of elongate wood screws 116 or the like tapped into the vertical wall surface. In this arrangement the sections of the brackets can be vertically separated as discussed above relative to FIG. 6. Wall anchors or the like (not shown) can be used if necessary. Similarly the attachment plate 24 could be mounted to vertical panels or the like by various forms of attachments including threaded fasteners passed through aligned holes in the attachment plate and the panel.

The display structure disclosed is intended to accommodate rather lightweight merchandise within the product case 6, i.e. weighing of the order of 2 kilograms. In this structure the mounting bracket 8 is of ¼ inch steel plate. The vertical tube 40 is of 18 gauge steel, ¾ inch diameter and 18 inches in length. The tube section 44.1 is similar in structure to the tube 40, the tube section 44.2 being slightly smaller, and the combined length of these tube sections being adjustable from about 12 inches to about 18 inches.

Where the merchandise within the display case 6 is of high value, the case may be fully enclosed and have a locked access door (not shown).

What is claimed is:

1. A merchandise display system comprising a carrier supported by a plurality of adjustably interconnected arms, one said arm being received in a mounting base that is adapted for connection to a mounting structure, said mounting base comprising:

a) a U-shaped clamping bracket comprising a flat web plate from a first side of which project two parallel limbs which define with the web a channel, an adjustable screw-threaded clamp being associated with one said limb and operative to coact with the other said limb to clamp said bracket to the mounting structure;

b) an attachment plate which lies parallel to an opposite side of said web plate and is detachably connected to said web plate by threaded screws that pass through aligned holes in said web plate and said attachment plate respectively, said holes being positioned for mutual alignment in a plurality of different orientations of said plate relative to said web; said attachment plate having connected thereto a sleeve that defines an axis lying parallel to said attachment plate, said sleeve being sized to slidably receive said one arm therein and including releasable locking means operative to secure said one arm at a selected longitudinal position therein; a first swivel joint interconnecting an end of said one arm with an adjacent end of a second said arm, said swivel joint including a swivel clamp that is operative to lock together said first and second arms in a selected relative orientation thereof; wherein said attachment plate has a wall projecting therefrom, said sleeve being detachably supported on said wall by a fastener which constitutes said releasable locking means.

2. A merchandise display system as claimed in claim 1 wherein said holes in said web plate and in said attachment plate provide for interengagement of said plates at orientations that are angularly displaced by 90°.

3. A merchandise display system as claimed in claim 1 wherein said sleeve is of C-shaped configuration having a pair of limbs arranged in spaced parallel relationship on opposite sides of said wall; said pair of limbs being spanned by said fastener which is operable to reduce a narrow gap between said limbs and thus constrict said sleeve around said one arm.

4. A merchandise display system as claimed in claim 1 wherein said second of said arms is telescopically adjustable in length comprising a first tubular portion sized to receive a second tubular portion slidably therein, said second arm carrying an adjustable clamp means effective to lock said sections in a selected position of adjustment; guideway means operating between said first and second sections to prevent relative rotation thereof.

5. A merchandise display system as claimed in claim 1 wherein the aligned holes in said web plate are screwthreaded and wherein said aligned holes in said attachment plate are unthreaded, in combination with attachment screws that are threaded to engage said threaded holes in said web plate and which have heads sized to lie against said attachment plate around said unthreaded holes.

6. A merchandise display system as claimed in claim 1 including a third arm attached to a second end of said second arm through an adjustable clamp, said carrier having an underside which defines a socket that is sized to receive said third arm.

7. A merchandise display system as claimed in claim 5 wherein said carrier comprises a horizontal support plate on the underside of which is provided said socket.

8. A merchandise display system as claimed in claim 1 wherein said adjustable clamping means comprises a clamping screw that extends in a direction at right angles to said limbs, said screw being in threaded engagement with one said limb and having a clamping head positioned in opposed relation to the other said limb and adjustable towards and away from said other limb upon rotation of said clamping screw.

* * * * *